United States Patent

[11] 3,549,161

| [72] | Inventors | Russell J. Pusztay<br>15210 Oak St., Dolton, Ill. 60419;<br>Joseph E. Olson, 301 Sheldon Ave.,<br>Downers Grove, Ill. 60515 |
|---|---|---|
| [21] | Appl. No. | 761,170 |
| [22] | Filed | Sept. 20, 1968 |
| [45] | Patented | Dec. 22, 1970 |

[54] POWER ASSIST HAND TRUCK
6 Claims, 6 Drawing Figs.

[52] U.S. Cl. ..................................................... 280/3,
74/157; 280/246
[51] Int. Cl. ..................................................... B60k 27/00
[50] Field of Search ........................................... 280/3, 151,
246, 240; 74/157; 254/2

[56] References Cited
UNITED STATES PATENTS

| 580,272 | 4/1897 | Gowen .......................... | 74/157 |
| 1,598,855 | 9/1926 | Dunlop.......................... | 280/240 |
| 1,614,764 | 1/1927 | Rowell .......................... | 280/3 |
| 3,183,013 | 5/1965 | Brown........................... | 280/3 |
| 3,269,740 | 8/1966 | Hutchinson ................. | 280/3 |

FOREIGN PATENTS

| 358,568 | 12/1905 | France ......................... | 280/3 |
| 364 | 1913 | Great Britain................ | 74/157 |
| 1,254,496 | 11/1967 | Germany..................... | 280/3 |

*Primary Examiner*—Leo Friaglia
*Attorney*—Elmer L. Zwickel

ABSTRACT: A power assist mechanism for a hand truck comprising a front assembly including a castor wheel having draft handle operated means selectively actuable to positively rotate the castor in either direction to assist movement of the truck over surface obstacles, and means to lock the castor against reverse movement while the handle operated means is being actuated.

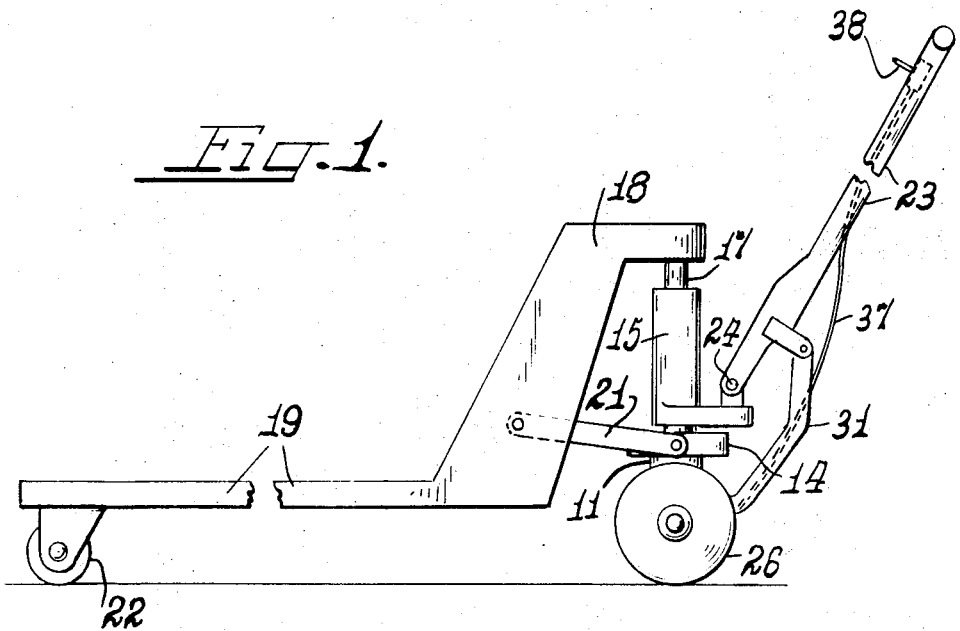
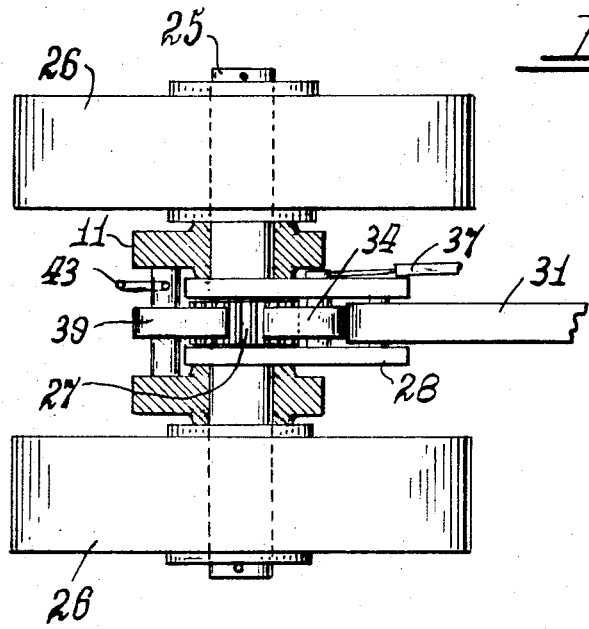
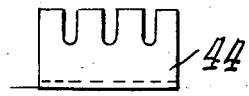
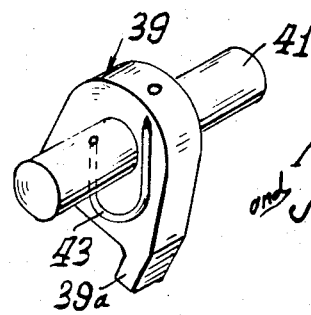
Inventors:
Russell J. Pusztay
and Joseph E. Olson
Elmer L. Zwickel
Atty.

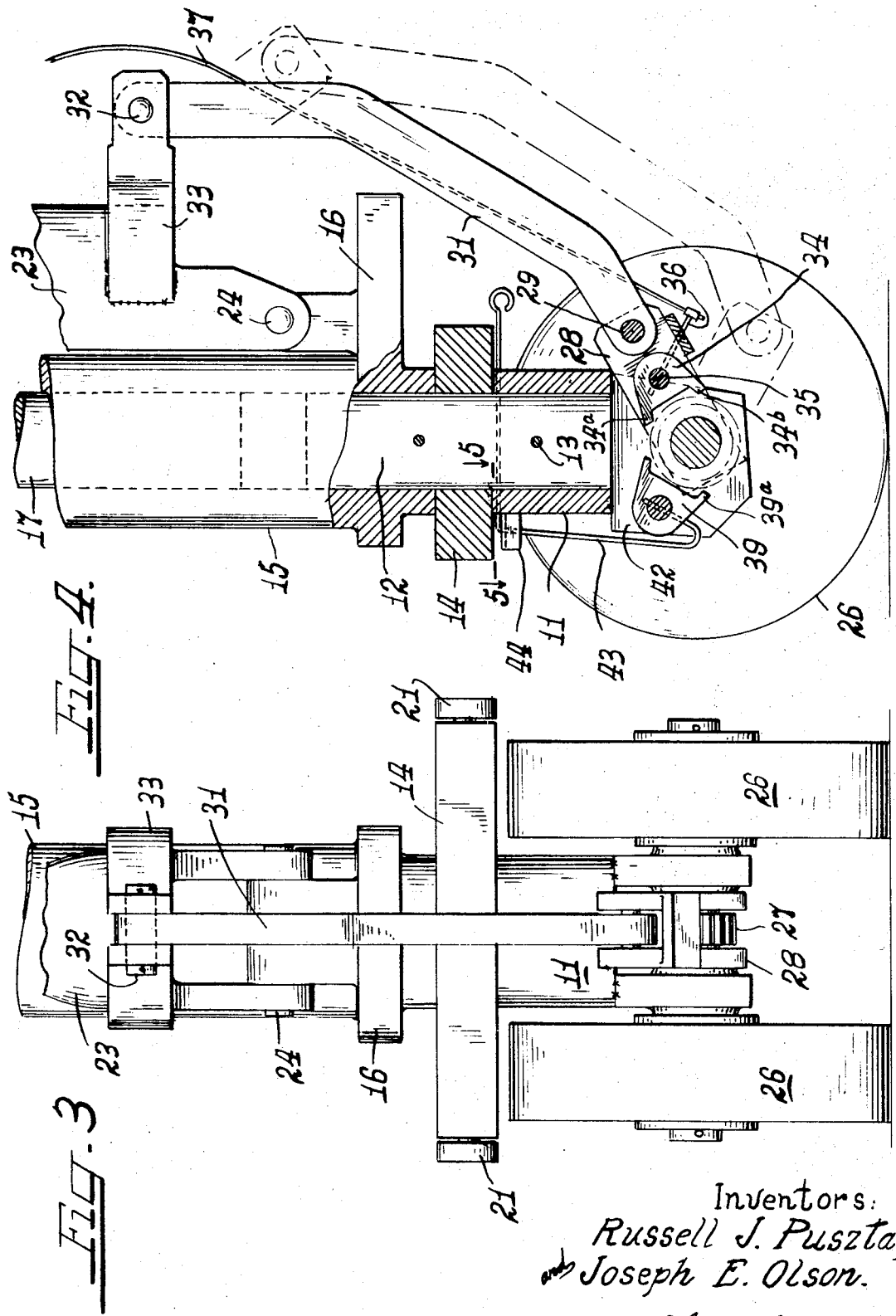

POWER ASSIST HAND TRUCK

The invention relates generally to improvements in hand trucks and is particularly concerned with novel means provided thereon to facilitate movement of the truck over an obstacle on the surface over which it is drawn. Generally, it is difficult to advance a loaded hand truck along or over a floor obstruction such as a ramp, door sills, or other obstacle. Various means have heretofore been proposed for overcoming this problem. In known instances assist mechanisms have been associated with the rear wheels of a truck which, when controlled from the draft handle, involves the use of complicated control linkage or other mechanism. This is particularly objectionable when installed in hand trucks of a type having a vertically adjustable load platform.

The present invention is concerned with the provision of novel draft handle actuated mechanism for positively and incrementally rotating the castor wheel on the front end of a hand truck so as to assist movement of the truck over an obstruction on the surface along which it is drawn. Generally, it comprises gear or ratchet integrally connected to the castor wheels and with which a selectively positioned pawl operably connected with the draft handle is engaged so that, upon vertical reciprocation of the handle, the castor is positively advanced in a forward or rearward direction. A back-lash pawl is also associated with the gear to prevent movement of the truck in a direction opposite to the intended direction of advance. The operable connection with the draft handle is such as to generate multiples of the applied force.

It is therefore an object of the invention to provide a power assist truck of the character referred to.

Another object is to provide novel power assist means for the lead wheels of a hand truck.

Another object is to provide novel means to increase the ratio of applied force.

Another object is to provide a structure of the character referred to which is not expensive or difficult to manufacture, is positive in its effect, and very useful.

Other objects and advantages of the invention will become apparent with reference to the following description and accompanying drawings.

In the drawings

FIG. 1 is a side elevational view of an exemplary form of hand truck, embodying the invention;

FIG. 2 is a horizontal sectional view through the castor wheel axis, showing parts mounted thereon in elevation;

FIG. 3 is a fragmentary elevational view of the front end of the hand truck;

FIG. 4 is a side elevational view of the swivel castor assembly, showing parts in section;

FIG. 5 is a detail view of the locking pawl latch plate, taken on line 5—5 of FIG. 4; and FIG. 6 is a perspective view of the locking pawl.

In the present structure all control mechanism is confined in the region of the swivelly mounted front wheel or castor assembly. More specifically, the front wheel assembly comprises a yoke 11 in the hub of which an upstanding steer shaft 12 is secured., as by pin 13. This shaft extends through a bearing plate 14 and carries on its upper projecting end an elongated boss or cylinder 15 having a draft handle mounting plate 16 integral with the lower end thereof. A piston 17 is fitted into the upper end of cylinder 15 to which is connected firmly, the front end 18 of the load platform 19. Links 21 connect the bearing plate 14 with the platform 19 so as to permit vertical movement of said platform. The rear end of said platform may be supported by usual wheels 22. A draft handle 23 is pivotally connected with the mounting plate 16, as at 24. In use, fluid pressure is admitted into cylinder 15 for raising the platform. The foregoing structure is more or less conventional and is described for purposes of reference only.

Referring now to FIGS. 2, 3 and 4, which best illustrate the novel structure, the yoke 11 mounts a shaft 25 onto the projecting ends of which are secured firmly, a pair of castor wheels 26. The intermediate portion of the shaft 25 mounts firmly, between the yoke arms, a gear 27. journaled on said shaft, on on each side of the gear 27 are a pair of arms 28 between the free ends of which is pivotally connected as at 29, the lower end of a link 31. This link extends upwardly in front of the assembly and its upper end is pivotally connected, as at 32, to an arm 33 formed integral with draft handle 23.

An escapement type pawl 34 is mounted firmly on a stud shaft 35 journaled at its ends in the arms 28. This pawl is disposed so as to be rotatably adjusted to carry either one of its teeth 34a—34b into position to engage with the gear 27. When in an intermediate position neither tooth 34a—34b is engaged with the gear. In order to move the pawl into a gear engaging position there is provided on the stud shaft 35 a radial stem 36 that is connected to a bowden cable 37 leading to the handle end of the draft handle where is is connected to a control lever 38. Thus, it is evident that upon manipulation of the control lever 38 the operator can move the pawl 34 into and out of engagement with the gear 27 readily.

Now, in order to afford a power assist to positively advance the truck in a forward direction, the control lever 38 is manipulated to engage the tooth 34b with gear 27. Upon intermittent or oscillatable rotation of the draft handle 23 about its pivot with plate 16, as indicated in broken lines in FIG. 4, the pawl causes intermittent rotation of gear 27 and connected wheels 26 in a direction to advance the truck forwardly.

To drive the truck in a rearward direction, the handle control 38 is manipulated to cause the tooth 34a to engage gear 27, and the handle is again manipulated. It is evident in view of the leverage obtained by the link connection 31 that the effort applied at the remote free end of the draft handle is greatly multiplied at the point of use, namely; at the pawl-gear assembly. Consequently, the truck can be advanced over an obstruction or up a ramp with little effort.

In order to prevent reverse roll of the truck while manipulating the draft handle, the assembly is provided with an escapement type back lash pawl 39. As best shown in FIG. 6, this pawl is carried firmly in a pin 41 that has its ends journaled in ears 42 (FIG. 2) formed integral with the yoke 11. This pawl 39 also has a pair of spaced teeth 39a either one or neither of which may be engaged with gear 27. Rotational adjustment of the pawl 39 is accomplished through positional setting of a lever 43 secured to the pin 41. For this purpose a multiple notched bracket 44 (FIG. 5) is carried by yoke 11 and in which the lever 43 is selectively engaged.

Although we have described a preferred embodiment of our invention, in considerable detail, it will be understood that the description thereof is intended to be illustrative, rather than restrictive, as details of the structure may be modified or changed without departing from the spirit or scope of the invention. Accordingly, we do not desire to be restricted to the exact construction described.

We claim:

1. In a pull truck having a front wheel assembly including a mounting, an upstanding column journaled in said mounting and extending downwardly therefrom, a draft handle pivotally mounted at one end to said mounting, a yoke on the lower end of said column, an axle journaled in said yoke, at least one wheel secured firmly to said axle, a gear secured firmly to said axle within said yoke, a pawl assembly journaled on said axle, within said assembly including an escapement type drive pawl engageable with the gear, and a link operably connecting the draft handle with the pawl assembly, said draft handle being operable to actuate the pawl assembly and rotate the axle.

2. In the pull truck recited in claim 1, in which a lock element is carried by the yoke operable to prevent rotation of the gear in a selected direction.

3. In the pull truck recited in claim 2 in which manual means is provided to position the lock assembly in locking position.

4. In the pull truck recited in claim 1, in which means is provided to position the drive pawl for engagement with the gear for rotating it in a selected direction.

5. In the pull truck recited in claim 1, in which the means to position the drive pawl comprises a cable.

6. In the pull truck recited in claim 1, in which there are two wheels secured to the axle one on each side of the yoke.